(12) United States Patent
Makino et al.

(10) Patent No.: US 6,390,354 B1
(45) Date of Patent: May 21, 2002

(54) ADHESIVE COMPOSITION FOR BONDING DIFFERENT KINDS OF MEMBERS

(75) Inventors: Takuma Makino, Nagoya; Masayuki Shinkai, Ama-gun, both of (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/238,731

(22) Filed: Jan. 28, 1999

(30) Foreign Application Priority Data

Feb. 18, 1998 (JP) .......................................... 10-052971

(51) Int. Cl.$^7$ ............................................... B23K 31/02
(52) U.S. Cl. ..................... 228/189; 228/175; 228/248.1; 228/248.5; 228/120; 228/121; 228/122.1
(58) Field of Search .................................. 228/189, 175, 228/248.1, 248.5, 120, 121, 122.1

(56) References Cited

U.S. PATENT DOCUMENTS

| | | | | |
|---|---|---|---|---|
| 4,919,974 A | * | 4/1990 | McCune et al. ............. | 427/249 |
| 4,932,582 A | | 6/1990 | Une ........................... | 228/122 |
| 5,127,969 A | | 7/1992 | Sekhar ........................ | 148/23 |
| 5,161,728 A | * | 11/1992 | Li ................................. | 228/124 |
| 5,614,320 A | * | 3/1997 | Beane et al. ................. | 428/403 |
| 5,783,316 A | * | 7/1998 | Colella et al. ............... | 428/660 |

FOREIGN PATENT DOCUMENTS

| | | |
|---|---|---|
| FR | 2 706 139 A1 | 12/1994 |
| GB | 1 590 695 | 6/1981 |
| GB | 2 108 534 A | 5/1983 |
| JP | 62-179889 | 1/1986 |
| JP | 63-8273 | 6/1986 |
| JP | 02-038376 | 7/1988 |
| JP | 02- 202041 | 1/1989 |
| JP | 01-249296 | 4/1989 |
| JP | 05-246769 | 3/1991 |
| JP | 05-163078 | 12/1991 |
| JP | 05-319944 | 5/1992 |
| JP | 07-069749 | 3/1995 |
| JP | 03-080160 | 8/1999 |
| JP | 03-205389 | 12/1999 |

OTHER PUBLICATIONS

"Boding of Ceramics(4), Bonding Process And Its Application(II)"; Shohei Tsuruga et al.; Yohsetu Gijutu (Welding Technology), pp. 114 to 119; Oct. 1988 No Translation.

* cited by examiner

Primary Examiner—M. Alexandra Elve
(74) Attorney, Agent, or Firm—Parkhurst & Wendel, L.L.P.

(57) ABSTRACT

A composite material is produced by a method where an adhesive composition which comprises a particulate material that reduces thermal stress and a brazing material containing a noble metal element as a base, wherein the adhesive composition can bond two or more kinds of different members to form a composite member with sufficient bond strength to avoid causing damages, such as cracks that occur on the side of the member that is weak against thermal stress, and also by a method to produce a composite member comprised of two or more kinds of different members, in which either the adhesive composition is used or the bonding portion of the different members is filled with the particulate material that reduces thermal stress, and then a molten brazing material is poured there into, and cooled to bond the members.

12 Claims, 2 Drawing Sheets

ADHESIVE COMPOSITION FOR BONDING DIFFERENT KINDS OF MEMBERS

FIELD OF THE INVENTION AND RELATED ART

The present invention relates to an adhesive composition considerably reduced in residual stress, and to the utilization of this composition. More particularly, it relates to; an adhesive composition that can be used to bond two or more kinds of members which maintain high airtightness and are very different from each other in terms of their thermal coefficient of expansion, a composite member comprising members bonded using the adhesive composition, and a method for producing the composite member using the adhesive composition.

In the case of bonding of different kinds of members, especially when one of the members is easily damaged by thermal stress, cracks occur at and around the bonded interface during the bonding operation, particularly during the cooling operation after bonding at high temperatures, and the desired bond strength cannot be maintained. Therefore, the resulting composite member, which is a bonded body of the different members, is frequently broken during use causing accidents and other related problems. Furthermore, since cracks occur in the member which is weak against thermal stress, high airtightness as composite members cannot be maintained, and hence, the composite members must be disposed of as defective products, which results in an overall increase in costs.

For example, as an example of bonding of different members, a brazing material is used for the bonding of a ceramics member and a metallic member. In this case, in order to assure wetting of the ceramics member with the brazing material, generally after the surface of the ceramics member to be bonded is plated with a metal such as Ni, both the members are positioned facing each other with a suitable space in between and then a brazing material is poured into the space to bond the members. However, this method is not sufficient for diminishing thermal stress, and cracks often occur on the side of the ceramics member which is easily damaged by thermal stress, to affect not only the bond strength, but also various performances required for composite members, such as airtightness.

Furthermore, in order to ease the thermal stress, there is employed a method of using as an intermediate material a metal of low thermal coefficient of expansion or a soft metal capable of easing thermal stress upon plastic deformation at the time of bonding and a method of optimizing the interfacial reaction layer.

However, these techniques also have faults and are not necessarily highly flexible. There is a high-pressure solid phase bonding method which is now under development, but this method has not yet attained sufficient bonding strength and still has some unresolved issues which must be cleared up before practical use is possible.

On the other hand, as a composite solder, JP-A-6-126479 discloses a solder containing a powder comprising a material with a higher melting point than a solder. By filling the powder, comprising a material with a higher melting point than the solder, only into the central portion of the body of solder, this composite solder aims at overcoming the insufficient wetting with solder due to the powder present on the surface of conventional solders. In other words, this composite soldier aims at increasing the bond strength at the bonded interface. However, this composite solder does not effectively diminish thermal stress, and thus cannot be used for the bonding of different kinds of members which contain large differences in the amount of strength that they possess against thermal stress.

SUMMARY OF THE INVENTION

The present invention provides, an adhesive composition for bonding two or more kinds of different members, which can bond the kinds of different members and maintain a proper bonding strength without causing a phenomenon, due to thermal stress during the cooling operation after bonding at high temperatures, of reduction in bond strength at or around the bonded interface, or the occurrence of cracks at the members which are easily damaged by thermal stress during cooling operation; a composite member comprised of members bonded using the adhesive composition; and a method for producing the composite member using the adhesive composition.

As a result of intensive research conducted by the inventors, it has been found that the above objects can be attained by using a brazing material as a base, which is less restricted by kind or shape of the members to be bonded, and has a wide range of selections for bonding form, and by adding a particulate material capable of reducing thermal stress to said brazing material. Thus, the present invention has been accomplished.

PREFERRED EMBODIMENTS OF THE INVENTION

Figure 1:
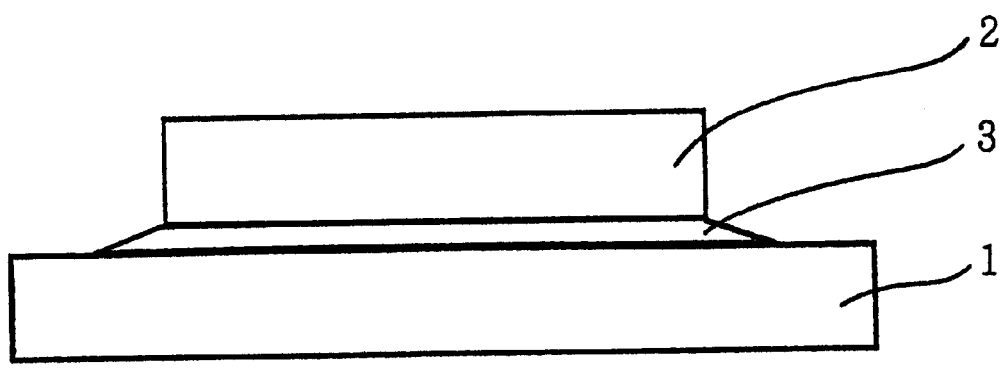
FIG. 1 is a schematic view showing the construction of a composite member subjected to measurement of residual stress.

The adhesive composition of the present invention, which can be used to bond two or more kinds of different members, can be prepared by adding a particulate material that reduces thermal stress to a brazing material. As the brazing material, there may be used any brazing materials as long as they can be used to bond different members with various differing properties, including thermal stress, such as ceramics members per se, metallic members per se, and a ceramic member and a metallic member. Of course, suitable materials can be selected depending on the properties of the members to be bonded. When either of the members to be bonded is a ceramics member, particularly, a porous ceramics member, brazing materials comprising a noble metal element, such as Ag, can be suitably used as a base. Such brazing materials include Ag—Cu—Ti brazing materials, Ag—Cu brazing materials and the like. Among them, suitable is BAg-8 (melting point: 780° C.) which is a silver based brazing material containing 27% of Cu.

Fine particles of ceramics and fine particles of cermet, which is a composite material of ceramics and metals, fine particles of low expansion metal can be suitably used as the particulate materials that reduce thermal stress. The ceramics fine particles include fine particles of silicon nitride, aluminum nitride, alumina and the like. The cermet fine particles include fine particles of Ni—$Al_2O_3$, Cu—$Al_2O_3$ and the like. The metal fine particles include fine particles of molybdenum and tungsten and the like. In order to efficiently reduce the thermal stress, it is necessary that the average particle size of these materials be within a given range. The average particle size is preferably 30–150 μm. When ceramics is used, wetting with brazing materials must be taken into consideration, and hence the surface must be plated with metals such as Ni, Cu and Ag. The plating method is not limited, but electroless plating is preferred.

The brazing material and the particulate material that reduces the thermal stress are usually mixed before use at a ratio of 70:30–10:90. However, bonding may also be carried out by pre-filling the part to be bonded with a given amount of the particulate material to reduce the thermal stress and then pouring therein a given amount of the brazing material in a molten state.

The combination of the different kinds of members which can be bonded with the adhesive composition of the present invention include, a ceramics member and a metallic member; ceramics members per se differing in various properties; and metallic members per se differing in various properties. Both oxide type ceramics members and non-oxide type ceramics members can be used as the ceramics members, however non-oxide type ceramics members lower in thermal coefficient of expansion and other members can be suitably used for bonding. Bonding of a ceramics member for separation of gases and a metal port member is an example of such bonding. According to the adhesive composition of the present invention, generation of thermal stress, as the temperature is lowered from a high temperature of 800° C. or higher at bonding to room temperature (about 25° C.) can be considerably diminished. Therefore, the adhesive composition can exhibit the desired effect in bonding of different kinds of members that posses large differences in thermal stress, for example, bonding of a non-oxide type ceramics member which is low in thermal coefficient of expansion and a metallic member which is high in thermal coefficient of expansion.

The bonding method of the present invention can be carried out by pouring the adhesive composition of the present invention, in molten state, which is a mixture of the brazing material and the particulate material to reduce the thermal stress, into the portion to be bonded between two or more kinds of different members, and then cooling according to the conventional method. The cooling time can be determined by considering the properties of the members to be bonded, but is usually in the range of 1–10 hours. The cooling operation is preferably carried out by a slow cooling method because this will significantly reduce the influence of thermal stress. The slow cooling method is carried out over a period of 2.5–5 times that employed for the usual cooling method, and this cooling method can minimize the influence of the thermal stress on the bonded portion.

Of course, the bonding can be performed by pre-filling a given amount of the material to reduce the thermal stress into the portion to be bonded between the members and thereafter pouring a given amount of the brazing material molten by heating to higher than the melting point into the portion to be bonded. The cooling method is the same as when the adhesive composition was used to obtain by mixing the brazing material with the particulate material that reduces the thermal stress.

As the composite members according to the present invention, mention may be made of those component members comprising two or more kinds of different members which are bonded with the adhesive composition of the present invention, for example, a composite member obtained by bonding a porous ceramics member and a metallic member extremely high in their thermal coefficient of expansion; ceramics members per se differing from each other in thermal coefficient of expansion; or metallic members per se differing from each other in thermal coefficient of expansion. A more specific example is a composite member for gas separation formed by bonding a porous alumina member used for separation of hydrogen gas and a metallic port member to be fitted to various gas analyzers. Of course, the composite members of the present invention include those obtained by bonding three or more kinds of different members.

EXAMPLE

The present invention will be explained by the following examples and comparative examples, however it should be understood that the present invention is not limited to these examples.

The method for the measurement of residual stress employed in the following examples will be explained. Since the thermal stress cannot be directly measured, strain (MPa) is measured by the following method and this is taken as the residual stress, and is regarded to be a measure of thermal stress. This is because this residual stress is generated as a result of the action of thermal stress during the cooling operation.

Measurement of this residual stress is conducted by bonding a metallic member 1 and a ceramics member 2 with an adhesive composition 3 provided therebetween as shown in FIG. 1, attaching a strain gauge to nearly the center of the ceramics member, then cooling the laminate to apply a stress caused by heat, thereafter forcedly removing the metallic member, and measuring the degree of strain generated in the cooling operation by the strain gauge.

(EXAMPLE)

An alumina member for gas separation as a ceramics member and a metal port member for fitting as a metallic member were bonded using an adhesive composition of the present invention which was prepared by adding Ni-plated alumina fine particles of 40 μm in average particle size as a particulate material reducing the thermal stress to BAg-8 brazing material at a ratio of 40:60. Bonding conditions were as follows.

Bonding temperature: 800° C.

Holding time: 10 minutes (800° C.)

Heating rate: 800° C./hour (1 hour from room temperature to 800° C. and 1 hour from 800° C. to room temperature)

Atmosphere: Vacuum ($10^{-6}$ torr)

In addition, a composite member was prepared using the same materials as above with slow cooling over a period of 5 hours.

The residual stress was measured on the resulting two composite members by the method explained above to obtain 67.3 and 17.6 MPa, respectively.

Figure 2:
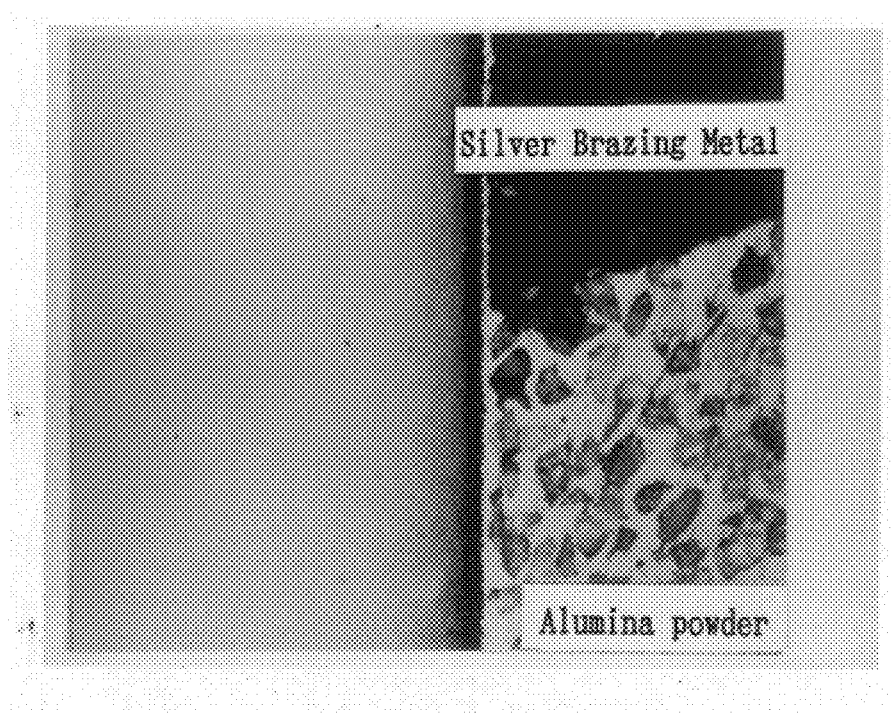
FIG. 2 is an electron microphotograph showing the state of bonded interface of the composite member according to the present invention.

The state of the interface of the bonded portion of the composite member prepared in accordance with conventional method was examined by an electron microscope to find no cracks as shown in FIG. 2.

COMPARATIVE EXAMPLE

Figure 3:
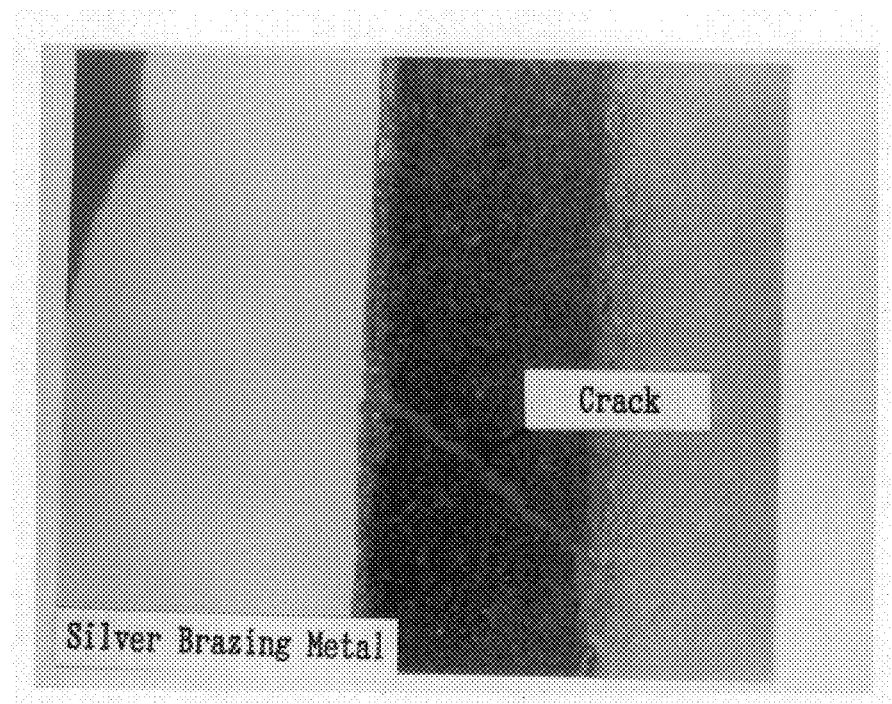
FIG. 3 is an electron microphotograph showing the state of bonded interface of the composite member according to a conventional method.

The same alumina member for gas separation and metallic member as used in the above Example were bonded using the brazing material BAg-8. In this case, the bonding surface of the alumina member for gas separation was plated with Ni. After cooling operation by the conventional method, the residual stress was determined by the above method to obtain 105 MPa. The state of the interface of the bonded portion of the composite member was examined by an electron microscope to find an occurrence of cracks as shown in FIG. 3.

The adhesive composition of the present invention has less residual stress, and therefore it does not cause the generation of cracks on the side of non-metallic members that readily suffer from mechanical fracture, such as ceramics members. Thus, composite members having sufficient bond strength can be produced. Furthermore, because cracks are not generated, the present invention can provide excellent composite members that have high airtightness requirements.

What is claimed is:

1. A method for producing a composite member, comprising:

providing at least two members, each with a different coefficient of thermal expansion;

placing the members adjacent each other, the members thereby defining at least one space between the members;

combining a brazing material and ceramic fine particles comprising a surface having a metal coating applied by plating or sputtering, to form a mixed adhesive composition;

placing the adhesive composition into the space;

heating the adhesive composition to produce a molten adhesive composition;

cooling the molten adhesive composition to produce a solid adhesive composition, thereby bonding the members together.

2. The method of claim 1, wherein the cooling is slow cooling taking 5 to 25 hours.

3. The method of claim 1, wherein the ratio of brazing material to particulate material is in the range of 70:30 to 10:90.

4. The method of claim 1, wherein the members are selected from the group consisting of porous ceramic members and metallic members.

5. The method of claim 1, wherein the members are a porous alumina member and a metallic port member.

6. The method of claim 5, wherein the porous alumina member comprises a device for separating hydrogen gas; and the port member comprises a fitting for a gas analyzer.

7. The method of claim 1, wherein said ceramic fine particles comprise a surface having a metal coating applied by sputtering.

8. The method of claim 1, wherein said brazing material comprises a base metal selected from the group consisting of Au, Ag, Cu, Pd, Al or Ni, and said particulate material is selected from the group consisting of ceramic fine particles, cermet fine particles or low-expansion metal fine particles.

9. The method of claim 1, wherein said ceramic fine particles comprise a surface having a metal coating applied by plating.

10. The method of claim 1, wherein at least one of the members is a ceramic member.

11. The method of claim 1, wherein the at least two members comprise a ceramic member and a metallic member.

12. A method for producing a composite member comprising:

providing two or more kinds of members differing in coefficients of thermal expansion;

placing the members opposite each other to define a space therebetween sufficient for bonding the members;

filling ceramic fine particles comprising a surface having a metal coating applied by plating or sputtering or cermet fine particles into said space;

pouring into said space a molten brazing material comprising a noble metal element as a base; and cooling to bond said members.

* * * * *